United States Patent [19]

Hattori et al.

[11] 4,095,576
[45] Jun. 20, 1978

[54] DWELL TIME CONTROL SYSTEM

[75] Inventors: Tadashi Hattori; Minoru Nishida; Yoshiki Ueno, all of Okazaki, Japan

[73] Assignee: Nippon Soken, Inc., Nishio, Japan

[21] Appl. No.: 727,534

[22] Filed: Sep. 28, 1976

[30] Foreign Application Priority Data

Oct. 2, 1975 Japan .................. 50-119114

[51] Int. Cl.² ............................................. F02P 9/00
[52] U.S. Cl. .............................. 123/148 E; 123/117 R
[58] Field of Search ......... 123/117 R, 148 E, 146.5 A

[56] References Cited

U.S. PATENT DOCUMENTS

| | | | |
|---|---|---|---|
| 3,831,571 | 8/1974 | Weber | 123/148 E |
| 3,867,916 | 2/1975 | Bigalke | 123/117 R |
| 3,881,458 | 5/1975 | Roozenbeek et al. | 123/148 E |
| 3,890,944 | 6/1975 | Werner et al. | 123/117 R |
| 3,937,193 | 2/1976 | Kim | 123/148 E |
| 3,940,658 | 2/1976 | Allred | 123/148 E |
| 3,943,896 | 3/1976 | Green et al. | 123/117 R |
| 3,995,608 | 12/1976 | Suda | 123/146.5 A |
| 4,008,698 | 2/1977 | Gartner | 123/117 R |
| 4,020,807 | 5/1977 | Del Zotto et al. | 123/117 R |

Primary Examiner—Charles J. Myhre
Assistant Examiner—Andrew M. Dolinar
Attorney, Agent, or Firm—Cushman, Darby & Cushman

[57] ABSTRACT

A dwell time control system for an internal combustion engine which controls the dwell time in response to the operating conditions of the engine in accordance with the charging and discharging of at least one capacitor.

First and second crankshaft angular positions are predetermined such that the former is in an advance position than the latter with respect to the crankshaft rotation. A capacitor starts charging at the second crankshaft angular position and stops charging at the ignition time at which the flow of current in the primary winding of the ignition coil is switched off. The charge of the capacitor is maintained until the next first crankshaft angular position following this ignition time. At the next first crankshaft angular position the capacitor starts to discharge and the flow of current is restarted in the primary winding upon completion of the discharging of the capacitor.

16 Claims, 6 Drawing Figures

DWELL TIME CONTROL SYSTEM

BACKGROUND OF THE INVENTION

1. Field of the Invention

The present invention relates to electronic ignition systems and more particularly to an electronic dwell time control system for an internal combustion engine wherein the time of starting the flow of primary current is determined by the output signal of a primary coil control circuit which is computed in accordance with the charging and discharging of at least one capacitor.

2. Description of the Prior Art

In a known type of ignition system in which current is supplied to the primary winding of the ignition coil and then the flow of this primary current is interrupted to induce a high voltage in the secondary winding, the point at which the flow of the primary current is started must be properly determined in addition to the ignition timing or the point at which the flow of primary current is interrupted. And it is desirable that the length of time during which the primary current flows in the ignition coil is maintained constant in consideration of the requirements of the ignition coil and the ignition energy. In a known type of mechanical ignition timing control system, the timing of opening and closing the contact points which connect and disconnect the primary winding with the ground is shifted in relation to the top dead center by the centrifugal governor and the angle during which the contact points are closed is always fixed irrespective of the rotational speed of the engine. On the other hand, in a known type of ignition system in which the ignition timing is electronically determined, the point at which the flow of primary current is started must be separately determined.

While these conventional ignition timing control systems have many advantages, they also have some disadvantages. In other words, while the above-described mechanical contact system is advantageous in that the angle during which the primary current flows is always maintained constant, there is a limit to the degree of freedom in the control of ignition timing, whereas in the case of the electronically controlled ignition timing it is necessary to separately compute the proper time instant for starting the flow of primary current, although there is the advantage of an increased degree of freedom in the control of ignition timing.

Moreover, with the regulations on the exhaust emission becoming increasingly severe in these days, optimum control of the ignition timing of an internal combustion engine in response to the engine operating conditions has become a very important problem in view of the desired reduction in exhaust emissions and improvement in the power output and fuel consumption. On the other hand, there has been a demand for exhaust emission control systems which are simple and inexpensive.

SUMMARY OF THE INVENTION

It is an object of this invention to provide an electronic dwell time control system for an internal combustion engine wherein the point at which the flow of primary current is started is precisely controlled in accordance with the rotational speed of the engine and which system is simple in construction on the whole.

In accordance with the present invention, there is thus provided a dwell time control system for use in combination with an internal combustion engine which is provided with an ignition coil having primary and secondary windings, ignition timing control means for producing an ignition timing signal at a time instant corresponding to at least one of operating parameters of said engine, and spark means connected to said ignition coil for sparking in response to an induced voltage of said secondary winding, said control system comprising crankshaft angular position detecting means disposed to detect first and second predetermined angular positions of a crankshaft of said engine for producing first and second crankshaft angular position signals, said first crankshaft angular position being located in an advanced position in relation to said second crankshaft angular position in the direction of rotation of said crankshaft; a charge and discharge current control circuit concentrated to said crankshaft angular position detecting means and said ignition timing control means and including capacitor means for controlling dwell time, said charge and discharge current control circuit being responsive to said second crankshaft angular position signal to start charging of said dwell time controlling capacitor means, said control circuit being responsive to said ignition timing signal produced from said ignition timing control means in response to said first and second crankshaft angular position signals to terminate the charging of said capacitor means, said control circuit being responsive to the next first angular position signal produced after the generation of said ignition timing signal to start discharging of said capacitor means; and an ignition coil energization control circuit connected to said ignition timing control means, said charge and discharge current control circuit and said ignition coil and responsive to said ignition timing signal to interrupt the flow of current in the primary winding of said ignition coil and to cause said spark means to spark, said ignition coil energization control circuit starting the flow of current in the primary winding of said ignition coil when the voltage across said discharging capacitor means decreases to a predetermined value.

DESCRIPTION OF THE PREFERRED EMBODIMENTS

Figure 1:
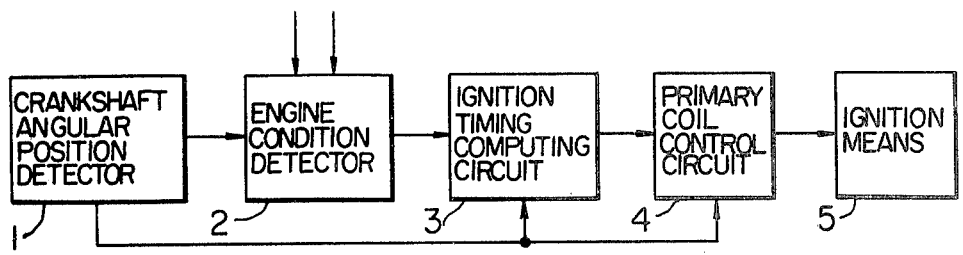
FIG. 1 is a block diagram showing an embodiment of a system according to the invention.

The present invention will now be described in greater detail with reference to the illustrated embodiment. In the illustrated embodiment, the system of this invention is used in the operation of a four-cylinder four-cycle internal combustion engine. In FIG. 1 showing a block diagram of the system of this invention, numeral 1 designates a crankshaft angular position detector for detecting the angular position of the engine crankshaft, 2 an engine condition detector connected to sensors (not shown) for detecting the operating conditions of the engine and responsive to the electric signals from the sensors to provide a voltage corresponding to the engine operating conditions, 3 an ignition timing computing circuit for determining the proper ignition timing in accordance with the charging and discharging of a capacitor, 4 a primary coil control circuit responsive to the output signals of the crankshaft angular position detector 1 and the ignition timing computing circuit 3 for controlling the primary winding of the ignition coil, 5 ignition means responsive to the output signal of the primary coil control circuit for interrupting the flow of current in the primary winding of the ignition coil and causing the spark plugs to produce the required ignition sparks upon interruption of the current flow in the primary winding.

Next, the detailed circuitry of the system of this invention constructed as described above will be described with reference to FIG. 2. In the crankshaft angular position detector 1, numeral 101 designates a rotor having four projections arranged on its outer periphery at equal intervals and fixedly mounted on the distributor shaft of the engine which is not shown for rotation therewith. Numerals 102 and 103 designate first and second electromagnetic pickups arranged along the circumferential direction of the rotor 101 to be mutually displaced by a predetermined angle and positioned to oppose the projections on the rotor 101. Numerals 106 and 107 designate transistors respectively connected to the electromagnetic pickups 102 and 103, 104 and 105 resistors. Numerals 108 and 109 designate NAND circuits constituting a flip-flop circuit having its one input connected to the collector of the transistor 106 and its other input connected to the collector of the transistor 107. The rotor 101 rotates once in the direction of the arrow for every two revolutions of the crankshaft so that when each of the projections on the rotor 101 passes the electromagnetic pickups 102 and 103, respectively, the electromagnetic pickups 102 and 103 respectively produce signals which go from a positive to negative state. Consequently, the electromagnetic pickups 102 and 103 detect crankshaft angular positions $M_1$ and $M_2$ for each cylinder of the engine. When the electromagnetic pickups 102 and 103 produce the negative signals, the transistors 106 and 107 are turned on so that the flip-flop circuit comprising the NAND circuits 108 and 109 comes into operation in response to the turning on of the transistors 106 and 107 and the flip-flop circuit produces the outputs shown in (a) and (b) of FIG. 3 and corresponding to the rotational speed of the engine.

Figure 2:
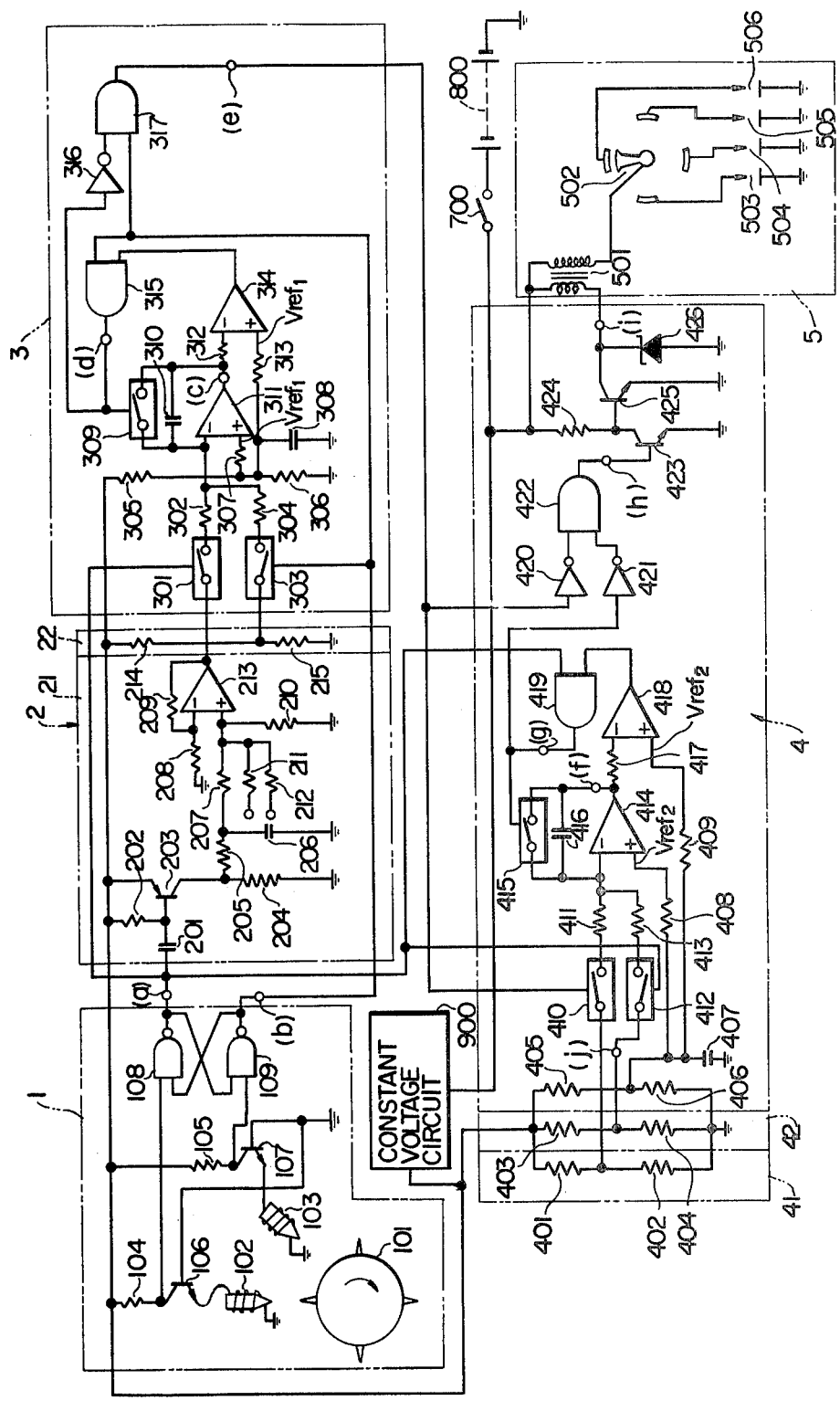
FIG. 2 is a wiring diagram showing an embodiment of the detailed circuitry of the system of the invention.

Next, the engine condition detector 2 will be described. The engine condition detector 2 comprises two main portions, i.e., a charge control section 21 and a discharge control section 22 as shown in FIG. 2.

The charge control section 21 will be described first using only the engine speed as a parameter indicative of the engine condition for purposes of simplicity. In the charge control section 21, an engine speed circuit for differentiating and then integrating the output pulses of the crankshaft angular position detector 1 is comprised of capacitors 201 and 206, resistors 202, 204 and 205 and a transistor 203. In other words, the differentiated pulse produced by the resistor 202 and the capacitor 201 is integrated by the capacitor 206. The transistor 203 is turned on only for the duration of the given time width of the differentiated pulse which is produced when the output pulse of the crankshaft angular position detector 1 goes from "1" to "0" and consequently the output potential of the capacitor 206 substantially linearly increases as the engine speed increases. This output is coupled for positive amplification to an adder circuit comprising input resistors 207, 208, 210, 211 and 212, a feedback resistor 209 and a differential amplifier 213. The input resistors 211 and 212 are connected to the circuits other than the engine speed circuit which are responsive to other parameters such as the intake pressure and the engine cooling water temperature. As mentioned earlier, only the engine speed circuit will be considered in the following description. With this construction, the output voltage of the differential amplifier 213 decreases as the engine rotational speed decreases, while the output voltage increases as the engine rotational speed increases. The discharge control section 22 comprises dividing resistors 214 and 215 and it produces a constant voltage.

The ignition timing computing circuit 3 comprises analog switches 301, 303 and 309 which are turned on in response to a "1" level signal, a charge resistor 302, a discharge resistor 304, bias resistors 305 and 306, capacitors 308 and 310, a differential amplifier 311, a comparator 314, input resistors 307, 312 and 313, AND circuits 315 and 317 and a NOT circuit 316, so that the analog switch 301 is turned on when the capacitor 310 charges, the analog switch 303 is turned on when the capacitor 310 discharges and the analog switch 309 is turned on when the capacitor 310 is reset. Each of these analog switches may be advantageously comprised of a field-effect transistor. The input voltage to the + input terminal of the differential amplifier 311 is a reference voltage $V_{ref\,1}$ and the capacitor 310 is connected between the − input terminal and the output terminal of the differential amplifier 311, Thus, using the reference voltage $V_{ref\,1}$ determined by the bias resistors 305 and 306 and applied to the + input terminal of the differential amplifier 311 as a basis of comparison, the capacitor 310 is charged when the input voltage applied to the − input terminal of the differential amplifier 311 is lower then the reference voltage $V_{ref\,1}$ applied to the + input terminal, whereas the capacitor 310 is discharged when the input voltage is higher than the reference voltage $V_{ref\,1}$. Consequently, it is necessary to preset so that the output voltage of the charge control section 21 of the engine condition detector 2 is lower than the reference voltage $V_{ref\,1}$ and the output voltage of the discharge control section 22 is higher than the reference voltage $V_{ref\,1}$. Thus, as shown in (c) of FIG. 3, the output of the differential amplifier 311 rises in the positive direction during charging periods and it decreases in the negative direction. Using the reference voltage $V_{ref\,1}$ applied to the + input terminal as a basis of comparison, the comparator 314 detects the amount of the charge in the capacitor 310 so that the output of the comparator 314 goes to a "0" level when the input voltage applied to the − input terminal is higher than the reference voltage $V_{ref\,1}$ applied to the + input terminal, whereas the output goes to a "1" level when the former is lower than the latter. The waveforms generated at points (d) and (e), respectively, under these conditions are shown respectively in (d) and (e) of FIG. 3.

The primary coil control circuit 4 comprises analog switches 410, 412 and 415 which are turned on in response to a "1" level signal, dividing resistors 401 and 402 constituting a charge control section 41, and dividing resistors 403 and 404, bias resistors 405 and 406, a charge resistor 411, a discharge resistor 413, input resistors 408, 409 and 417, capacitors 407 and 416, a differential amplifier 414, a comparator 418, AND circuits 419 and 422, NOT circuits 420 and 421, a transistor 423, a collector resistor 424, an output transistor 425 and a back electromotive force absorbing diode 426 constituting a discharge control section 42. The analog switch 410 is turned on when the capacitor 416 is charged, the analog switch 412 is turned on when the capacitor 416 is discharged and the analog switch 415 is turned on when the capacitor 416 is reset. On the other hand, when the analog switches 410, 412 and 415 are turned off simultaneously, the charge stored in the capacitor 416 is maintained. Each of these analog switches may also be advantageously comprised of a field-effect transistor. The input voltage applied to the + input terminal of the differential amplifier 414 is a reference voltage $V_{ref2}$ and the capacitor 416 is connected between the − input terminal and the output terminal of the differential amplifier 414. The capacitor 416 charges when the input voltage applied to the − input terminal of the differential amplifier 414 is lower than the reference voltage $V_{ref2}$ determined by the bias resistors 405 and 406 and applied to the + input terminal of the differential amplifier 414, whereas the capacitor 416 discharges when the said input voltage is higher than the reference voltage $V_{ref2}$. Consequently, it is essential to preset so that the charging voltage determined by the dividing resistors 401 and 402 is lower than the reference voltage $V_{ref2}$ and the discharge voltage determined by the dividing resistors 403 and 404 is higher than the reference voltage $V_{ref2}$. As shown in (f) of FIG. 3, the output of the differential amplifier 414 has the waveform so that it rises in the positive direction when the capacitor 416 is charging, whereas it falls in the negative direction when the capacitor 416 is discharging. Employing the reference voltage $V_{ref2}$ as a basis of comparison, the comparator 418 detects the amount of the charge in the capacitor 416 so that the output of the comparator 418 goes to the "0" level when its input voltage is higher than the reference voltage $V_{ref2}$ applied to the + input terminal of the comparator 418, whereas the output of the comparator 418 goes to the "1" level when the said input voltage is lower than the reference voltage $V_{ref2}$. The waveforms generated at points (g) and (h), respectively, under these conditions are shown in (g) and (h) of FIG. 3. Consequently, the output of the AND circuit 422 goes to "1" upon completion of the discharge of the capacitor 310 in the ignition timing computing circuit 3, whereas the output of the AND circuit 422 goes to "0" upon completion of the discharge of the capacitor 416 in the primary coil control circuit 4. The output of the AND circuit 422 is subjected to current amplification through the temperature 423 and 425 and then coupled to the ignition means 5.

The ignition means 5 comprises an ignition coil 501, a distributor 502 and spark plugs 503, 504, 505 and 506, so that when the transistor 425 is turned off, the current in the primary winding of the ignition coil 501 is interrupted and a high voltage is induced in the secondary winding of the ignition coil 501, thus producing an ignition spark at each of the spark plugs 503, 504, 505 and 506 through the distributor 502. Numeral 700 designates a key switch, 800 a battery, 900 a constant voltage circuit of known type.

Next, with the construction described above, the operation of the system of this invention shown in FIG. 2 will be described with reference to the signal waveforms shown in (a) to (i) of FIG. 3. When the engine crankshaft makes two revolutions, the rotor 101 makes one rotation in the direction of the arrow in FIG. 2 along with the distributor shaft which is not shown, so that as shown in (a) of FIG. 3, the crankshaft angular position detector 1 produces at its output terminal (a) an output which goes to the "1" level during a period $M_1$ to $M_2$ and to the "0" level during a period $M_2$ to $M_1$, thus generating a rectangular waveform having a frequency of 2 Hz or 2 pulses per revolution of the engine. When the output terminal (a) of the crankshaft angular position detector 1 goes to the "1" level, the analog switch 301 is turned on and the analog switch 303 is turned off and thus the capacitor 310 is charged through the charge resistor 302 as shown in (c) of FIG. 3. With the charging of the capacitor 310 started in this way, the output voltage of the differential amplifier 311 becomes higher than the reference voltage $V_{ref1}$ and the output of the comparator 314 goes to the "0" level. Then, when the output at the output terminal (a) of the crankshaft angular position detector 1 goes to the "0" level and the output at its output terminal (b) goes to the "1" level, the analog switch 301 is turned off and the analog switch 303 is turned on, thus causing the capacitor 310 to discharge through the discharge resistor 304. When the output of the differential amplifier 311 drops to the level of the reference voltage $V_{ref1}$ so that the output of the comparator 314 goes to the "1" level and the two input terminals of the AND circuit 315 go to the "1" level, the analog switch 309 is turned on thus shortcircuiting the capacitor 310 to reset it. When the output terminal (a) of the crankshaft angular position detector 1 again goes to the "1" level, the same operation as mentioned above is repeated.

Assume now that symbol S designates the end of the discharge of the capacitor 310, T the top dead center position, $\theta_1$ the angle between the crankshaft angular positions $M_1$ and $M_2$, $\theta_2$ the angle between the positions $M_2$ and S, $\alpha$ the angle between the positions S and T, $\theta_3$ the angle between the positions T and $M_1$. Now, with the output potential of the discharge control section 22 being fixed as in the case of the illustrated embodiment, when the output potential of the charge control section 21 is decreased, the charging current of the capacitor 310 is increased and the value of $\alpha$ is decreased, namely, if the discharge ending point S is used as the ignition point, the ignition point is moved to a retarded position, whereas when the output potential of the charge control section 21 is increased, the discharge ending point S or the ignition point is moved to an advanced position. Thus, when the engine speed is increased, the output voltage of the differential amplifier 213 of the engine condition detector 2 is increased and the ignition timing (i.e., the discharge ending point S) is advanced, whereas when the engine speed is decreased, the output voltage of the differential amplifier 213 is decreased and the ignition timing is retarded. Assuming that $i_1$ represents the charging current of the capacitor 310 and $i_2$ represents its discharging current, then the advance angle $\alpha$ is given as follows $$\alpha = 180 - (\theta_1 + \theta_2 + \theta_3)$$

Then, since $$i_1\theta_1 = i_2\theta_2, \theta_2 = \frac{i_1}{i_2}\theta_1$$

Therefore, $$\alpha = (180 - \theta_3) - (1 + \frac{i_1}{i_2})\theta_1$$
$$= (180 - \theta_3 - \theta_1) - \frac{i_1}{i_2}\theta_1$$

Since $\theta_1$ and $\theta_3$ are fixed, we obtain $$\alpha = K_1 - \frac{i_1}{i_2} K'_2 \, (K_1 \text{ and } K'_2 \text{ are constants})$$

Since the value of $i_2$ is fixed in the present embodiment, we obtain $$\alpha = K_1 - i_1 K_2 \, (K_2 \text{ is a constant})$$

Thus, by controlling the value of $i_1$ in the same way as in this embodiment, it is possible to obtain any desired advance angle value.

In the primary coil control circuit 4, when the capacitor 310 of the ignition timing computing circuit 3 discharges, the analog switch 410 is turned on and the analog switch 412 is turned off thus charging the capacitor 416, whereas when the capacitor 310 is reset, the analog switches 410 and 412 are turned off and the voltage developed across the capacitor 416 is maintained. When the capacitor 310 is charged again so that the analog switch 410 is turned off and the analog switch 412 is turned on, the capacitor 416 starts discharging ((f) of FIG. 3). When the output of the capacitor 416 becomes lower than the reference voltage $V_{ref2}$, the output of the comparator 418 goes to the "1" level and the analog switch 415 is turned on. This operation is similar to that of the ignition timing computing circuit 3. Assuming now that D represents the point at which the discharge of the capacitor 416 is terminated, $\theta_4$ represents the angle between $M_1$ and D, $i_3$ represents the charging current of the capacitor 416 and $i_4$ represents the discharge current of the capacitor 416, then $$\theta_4 = \frac{i_3}{i_4}\theta_2$$

since $i_4\theta_4 = i_3\theta_2$. Thus, the number of degrees of crankshaft rotation (S to D) from the discharge ending point S of the capacitor 310 in the ignition timing computing circuit 3 to the discharge ending point D of the capacitor 416 is given as follows $$(S \text{ to } D) = \alpha + \theta_3 + \theta_4 = \alpha + \theta_3 + \frac{i_3}{i_4}\theta_2$$

If $i_3 = i_4$, $$(S \text{ to } D) = \alpha + \theta_3 + \theta_2$$
$$= 180 - \theta_1$$

Thus, the number of degrees of crankshaft rotation between the points S and D is fixed. Consequently, if the flow of current in the primary winding of the ignition coil 501 is interrupted at the discharge ending point S of the capacitor 310 and the flow of current in the primary winding of the ignition coil 501 is started at the discharge ending point D of the capacitor 416, the interruption angle is fixed irrespective of the engine speed. On the other hand, by controlling the charging and discharge currents $i_3$ and $i_4$ in accordance with the engine speed, it is possible to easily control the interruption angle. Further, the conducting angle (D to S) is given as follows $$(D \text{ to } S) = \theta_1 - \theta_4 + \theta_2$$
$$= \theta_1 - (\frac{i_3}{i_4} - 1)\theta_2$$

Figure 3:
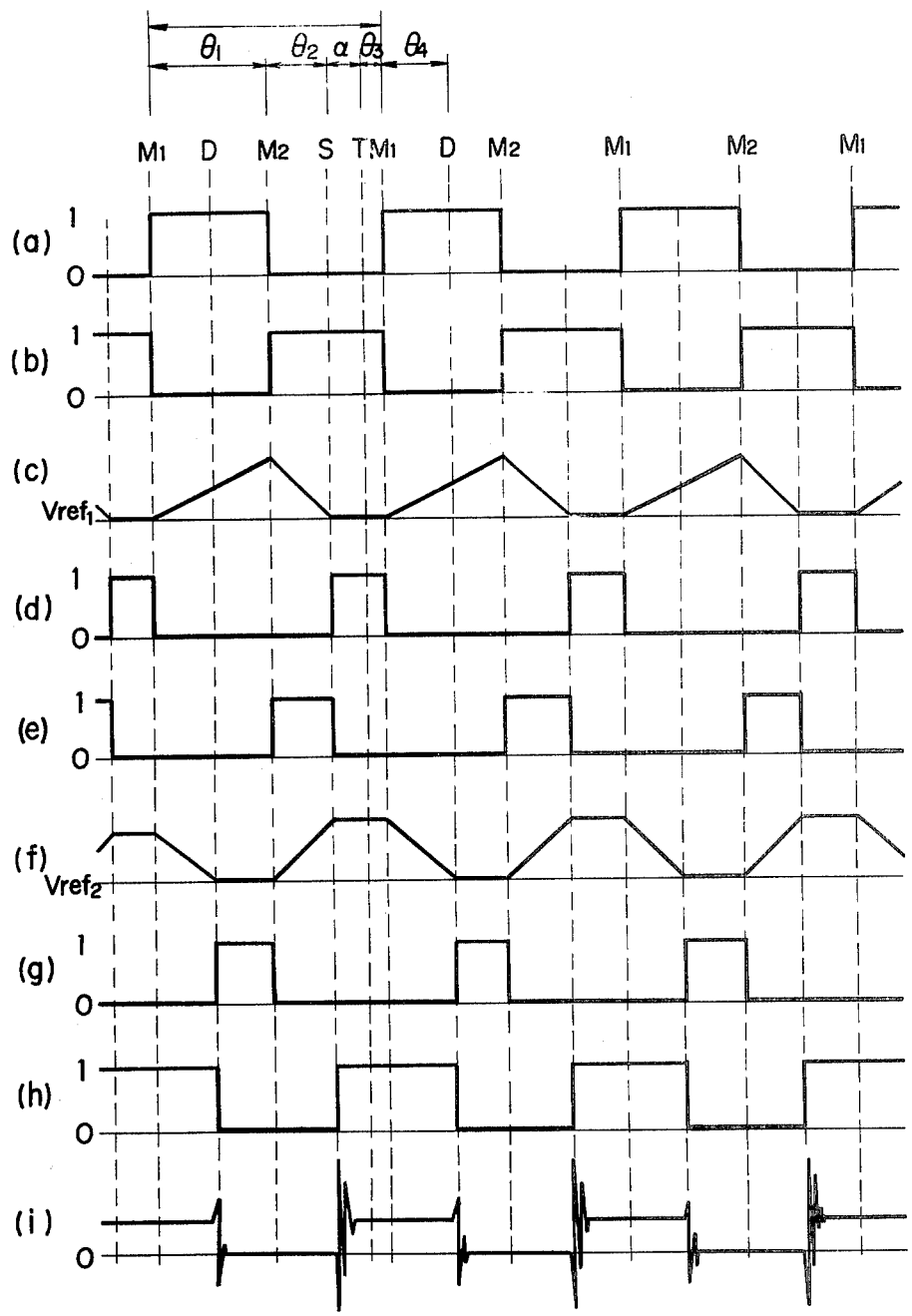
FIG. 3 is a signal waveform diagram useful for explaining the operation of the system of this invention shown in FIG. 2.

On the other hand, the output (h) of the AND circuit 422 takes the form of a rectangular waveform which goes to the "1" level at the point S and to the "0" level at the point D as shown in (h) of FIG. 3, and the current flow in the primary winding of the ignition coil 501 is interrupted at the point S by this output through the transistors 423 and 425 thus causing the spark plugs 503, 504, 505 and 506 to produce ignition sparks as mentioned earlier.

Figure 4:
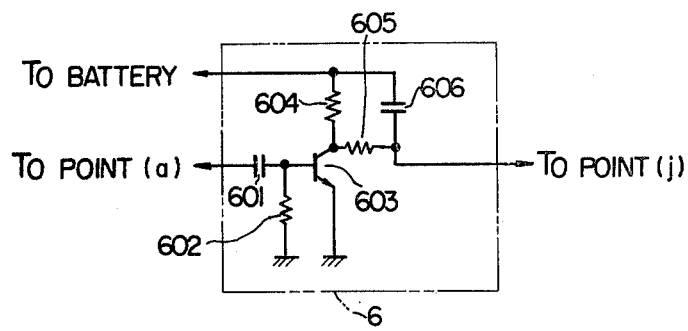
FIG. 4 is a wiring diagram showing another embodiment of the discharge control section of the primary coil control circuit used in the system of this invention shown in FIG. 2.

While, in the foregoing description, the primary winding of the ignition coil 501 is controlled by the primary coil control circuit 4 so that the conducting period of the primary winding of the ignition coil 501 corresponds to a fixed number of crankshaft rotation, the primary winding of the ignition coil 501 may be controlled by a discharge control circuit 6 of FIG. 4 in place of the dividing resistors 403 and 404 of the discharge control section 42, in which case the degrees of crankshaft rotation corresponding to the conducting period of the primary winding of the ignition coil 501 is not fixed, that is, the corresponding degree of crankshaft rotation decreases as the engine speed decreases, while it increases as the engine speed increases. In FIG. 4, the discharge control circuit 6 comprises capacitors 601 and 606, resistors 602, 604 and 605 and a transistor 603, and its points (a) and (j) are respectively connected to the points (a) and (j) in FIG. 2. The output pulse of the crankshaft angular position detector 1 is differentiated and then integrated in the discharge control circuit 6, namely, the differentiated pulse produced by the resistor 602 and the capacitor 601 is integrated by the capacitor 606 through the resistors 604 and 605. As a result, the transistor 603 is turned on only for the duration of a given time width of the differentiated pulse produced when the crankshaft angular position detector 1 goes from "0" to "1", and the output terminal voltage of the capacitor 606 decreases as the engine rotational speed increases. In this case, as previously mentioned, the conducting angle (D to S) is given as $$(D \text{ to } S) = \theta_1 - (\frac{i_3}{i_4} - 1)\theta_2.$$

Since $i_3$ is fixed, the above equation can be expressed by $$(D \text{ to } S) = \theta - (\frac{h}{i_4} - 1)\theta_2$$

Figure 5:
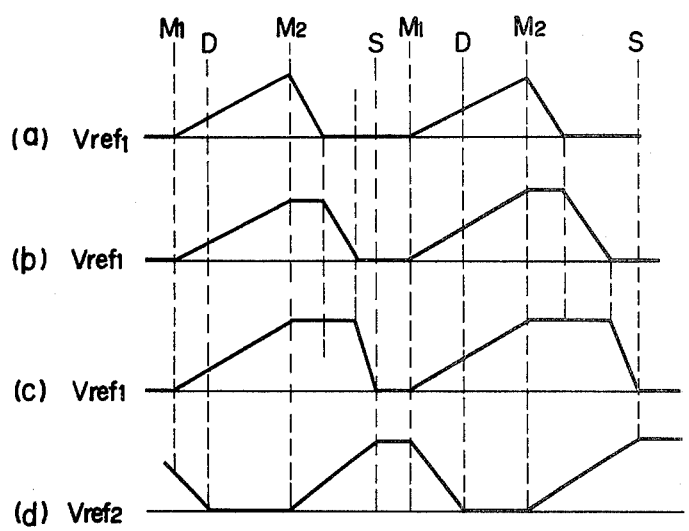
FIG. 5 is a characteristic diagram showing the charging conditions of the capacitors which are useful for explaining the operation of the primary coil control circuit when using another embodiment of the ignition timing computing circuit in the system of the invention.
Figure 6:
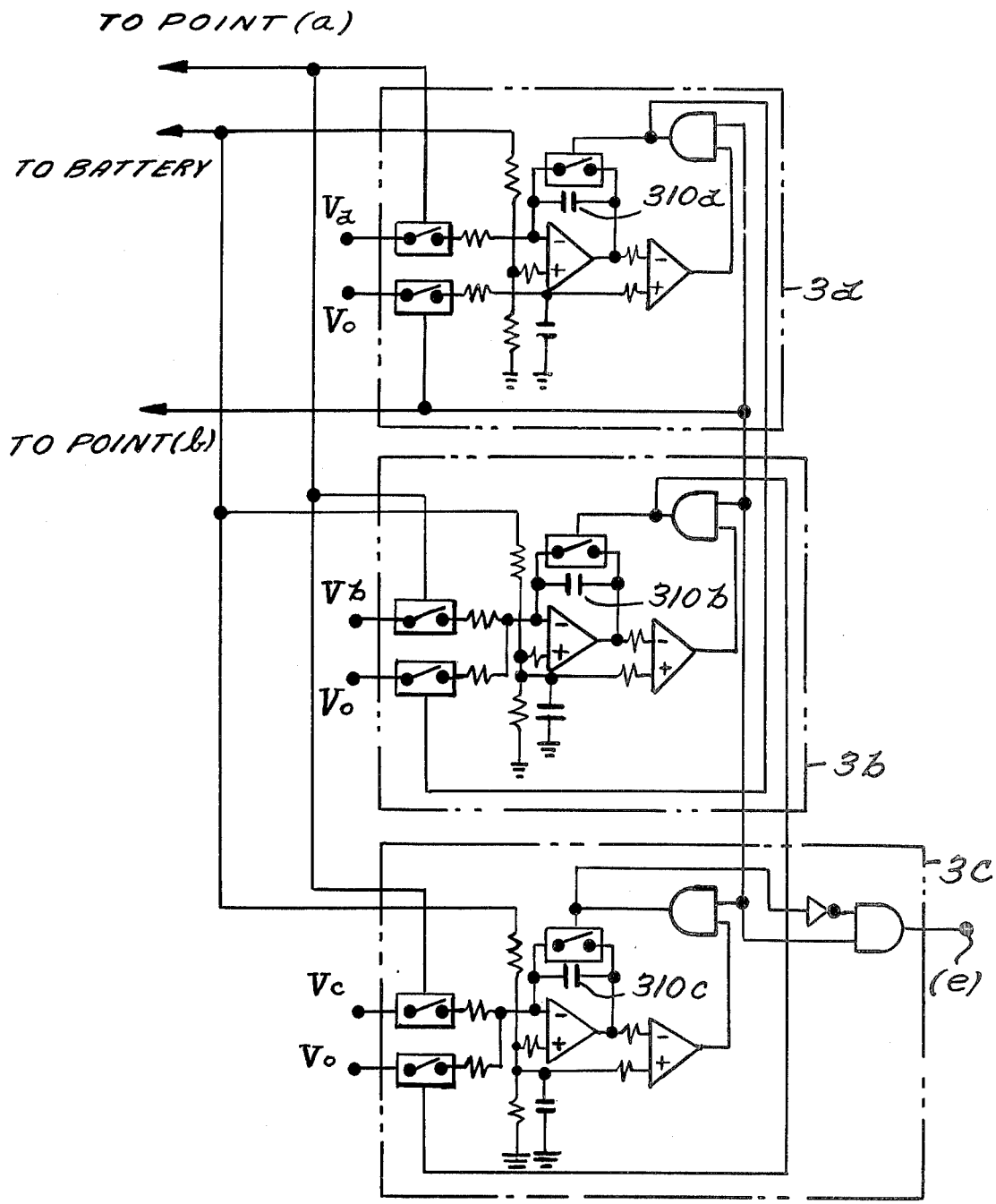
FIG. 6 is a schematic diagram of an embodiment of the ignition timing computing circuit of FIG. 3 of the system shown in FIG. 1.

(where $h$ is a constant). Since, with the circuit of FIG. 4, the discharge current $i_4$ of the capacitor 416 increases as the engine speed increases, the degree of crankshaft rotation (D to S) corresponding to the conducting period of the primary winding of the ignition coil 501 increases as the engine speed increases, whereas the angle (D to S) decreases as the engine speed decreases. While, in the circuit of FIG. 4, the dicharge current $i_4$ changes in direct proportion to the engine speed, the charging current $i_3$ may be caused to change in inverse proportion to the engine speed. Further, while, in the above-described embodiment, the computation in the ignition timing computing circuit 3 is carried out by changing the charging current of the capacitor 310, many other modifications are possible by changing the discharging current. Alternately, a similar effect may be obtained by accomplishing the required computation by means of a multiple capacitor system in which as for example, a plurality of capacitors are simultaneously charged during the period $M_1$ to $M_2$, the first capacitor is started discharging at the position $M_2$ while holding the charge stored in the second, third, . . . capacitors, and the second capacitor starts discharging in response to the termination of the discharge of the first capacitor, the third capacitor starts discharging in response to the termination of the discharge of the second capacitor and so on, thus utilizing the period between $M_2$ and the termination of the discharge of the final capacitor as the previously mentioned S. A schematic diagram of such a multiple capacitor ignition timing computing circuit 3 is shown in FIG. 6 for a circuit utilizing three capacitors, 310a, 310b, and 310c. Capacitors 310a, 310b and 310c are provided in first, second and third circuits, 3a, 3b and 3c, respectively. Circuits 3a, 3b and 3c are constructed to operate as described above. Voltages Va, Vb and Vc, respectively applied to circuits 3a, 3b and 3c are preferably chosen dependent on the speed, vacuum pressure and coolant temperature respectively, and voltage $V_o$, applied to each of circuits 3a, 3b and 3c, is preferably a constant. FIG. 5 is a waveform diagram showing the charging conditions of capacitors in the circuit of FIG. 6. In FIG. 5, the charging and discharging waveforms of the first, second and third capacitors 310a, 310b and 310c are respectively shown in (a), (b) and (c) and the charging and discharging waveform of the capacitor 416 of the primary coil control circuit 4 (FIG. 2) which is connected to the point (e) in FIG. 6 is shown in (d).

Furthermore, while, in the above-described embodiment, the ignition timing computing circuit computes the ignition timing in accordance with the charging and discharging of the capacitor, a similar effect may be obtained by another ignition timing computing circuit in which the desired ignition timing is determined by computing the degree of retard angle in relation to a reference angular position provided that one more reference angular position is used. Still furthermore, by detecting two different angular positions, it is possible to obtain a similar effect with any of the ignition timing control systems for distributors with mechanical contact points and transistorized amplifier in which the ignition timing is mechanically determined, or contactless type distributors.

Still further, while, in the primary coil control circuit 4, The integrating circuit consists of a Miller integrator, any other integrating circuit, e.g., a bootstrap or constant current monostable circuit may also be used.

We claim:

1. A dwell time control system for use in combination with an internal combustion engine which is provided with an ignition coil having primary and secondary windings, ignition timing control means for producing an ignition timing signal at a time instant corresponding to at least one of operating parameters of said engine, and spark means connected to said ignition coil for sparking in response to an induced voltage of said secondary winding, said control system comprising:

crankshaft angular position detecting means disposed to detect first and second predetermined angular positions of a crankshaft of said engine for producing first and second crankshaft angular position signals, said first crankshaft angular position being located in an advanced position in relation to said second crankshaft angular position in the direction of rotation of said crankshaft;

a charge and discharge current control circuit connected to said crankshaft angular position detecting means and said ignition timing control means and including capacitor means for controlling dwell time, said charge and discharge current control circuit being responsive to said second crankshaft angular position signal to start charging of said dwell time controlling capacitor means, said control circuit being responsive to said ignition timing signal produced from said ignition timing control means in response to said first and second crankshaft angular position signals to terminate the charging of said capacitor means, said control circuit being responsive to the next first angular position signal produced after the generation of said ignition timing signal to start discharging of said capacitor means; and an ignition coil energization control circuit connected to said ignition timing control means, said charge and discharge current control circuit and said ignition coil and responsive to said ignition timing signal to interrupt the flow of current in the primary winding of said ignition coil and to cause said spark means to spark, said ignition coil energization control circuit starting the flow of current in the primary winding of said ignition coil when the voltage across said discharging capacitor means decreases to a predetermined value.

2. A system according to claim 1, wherein the charging current and the discharge current of said capacitor means have the same magnitude.

3. A system according to claim 1, wherein said charge and discharge current control circuit includes means for varying the magnitude of at least one of the charging current and the discharge current of said capacitor means in accordance with at least one operating parameter of said engine.

4. A system according to claim 3, wherein said current variation means charges at least one of the charging current and the discharge current of said capacitor means in accordance with the rotational speed of said engine.

5. A system according to claim 4, wherein said current variation means comprises:

a differentiation circuit for differentiating said first crankshaft angular position signal;

a transistor connected to said differentiation circuit to be turned on in response to the output of said differentiation circuit; and an integrating capacitor connected to said transistor to develop thereacross a voltage varying in accordance with the output of said differentiation circuit.

6. A system according to claim 1, wherein said dwell time controlling capacitor means comprises a plurality of capacitors.

7. A system according to claim 1, wherein said charge and discharge current control circuit comprises:

charge control means for charging said capacitor means;

first switch means connected between said charge control means and said capacitor means to be closed in response to said second crankshaft angular position signal;

discharge control means disposed to discharge said capacitor means; and second switch means connected between said discharge control means and said capacitor means to be closed in response to said first crankshaft angular position signal produced after the generation of said ignition timing signal;

said first and second switch means opening in response to said ignition timing signal to hold the voltage developed across said capacitor means.

8. A system according to claim 1, wherein said charge and dischare current control circuit comprises:

a first voltage divider connected between a power source and the ground for providing a voltage lower than a reference voltage;

a first analog switch connected to said first voltage divider to be closed in response to said second crankshaft angular position signal;

a second voltage divider connected between said power source and the ground for providing a voltage higher than said reference voltage;

a second analog switch connected to said second voltage divider to be closed in response to said first crankshaft angular position signal produced after the generation of said ignition timing signal;

a differential amplifier having a first input terminal for receiving said reference voltage and a second input terminal connected to said first and second analog switches, said capacitor means being connected between an output terminal of said differential amplifier and said second input terminal, whereby said capacitor means is selectively charged and discharged in accordance with the difference between the voltages at said first and second input terminals;

a comparator having a first input terminal for receiving said reference voltage and a second input terminal connected to the output of said differential amplifier for producing a discrimination signal to start the flow of current in the primary winding of said ignition coil when the voltage across said capacitor means decreases to a predetermined value in response to the discharging thereof; and a third analog switch connected across said capacitor means and to said comparator to be closed in response to said discrimination signal and thereby completely discharge said capacitor means;

whereby the closing of said first analog switch causes said capacitor means to start charging, said first, second and third analog switches open in response to said ignition timing signal to hold the voltage developed across said capacitor means, and the closing of said second analog switch causes said capacitor means to start discharging.

9. A system according to claim 8, wherein said ignition coil energization control means comprises ignition coil energizing means connected to said ignition timing control means, said comparator and said ignition coil and including at least one transistor, said ignition coil energizing means being responsive to said ignition timing signal to interrupt the flow of current in the primary winding of said ignition coil, said ignition coil energizing means being responsive to said discrimination signal to start the flow of current in said primary winding.

10. A system according to claim 8, wherein each of said first, second and third analog switches is a field-effect transistor.

11. A dwell time control system for use in combination with an internal combustion engine which is provided with an ignition coil having primary and secondary windings, and spark means connected to said ignition coil for sparking in response to an induced voltage of said secondary winding, said control system comprising:

crankshaft angular position detecting means disposed to detect first and second predetermined angular positions of a crankshaft of said engine for producing first and second crankshaft angular position signals, said first crankshaft angular position being located in an advanced position in relation to said second crankshaft angular position in the direction of rotation of said crankshaft;

ignition timing computing means connected to said crankshaft angular position detecting means and responsive to said first and second crankshaft angular position signals for producing an ignition timing signal at a time instant corresponding to at least one of operating parameters of said engine;

a charge and discharge current control circuit connected to said crankshaft angular position detecting means and said ignition timing computing means and including capacitor means for controlling dwell time, said charge and discharge current control circuit being responsive to said second crankshaft angular position signal to start charging of said dwell time controlling capacitor means, said control circuit being responsive to said ignition timing signal produced from said ignition timing computing means in response to said first and second crankshaft angular position signals to terminate the charging of said capacitor means, said control circuit being responsive to the next first angular position signal produced after the generation of said ignition timing signal to start discharging of said capacitor means; and an ignition coil energization control circuit connected to said ignition timing computing means, said charge and discharge current control circuit and said ignition coil and responsive to said ignition timing signal to interrupt the flow of current in the primary winding of said ignition coil and to cause said spark means to spark, said ignition coil energization control circuit starting the flow of current in the primary winding of said ignition coil when the voltage across said discharging capacitor means decreases to a predetermined value.

12. A system according to claim 11, wherein said ignition timing computing means comprises:

an engine condition detector responsive to at least one operating parameter of said engine for producing a voltage lower than a reference voltage;

a first analog switch connected to said engine condition detector to be closed in response to said first crankshaft angular position signal;

a first voltage divider connected between a power source and the ground for producing a voltage higher than said reference voltage;

a second analog switch connected to said first voltage divider to be closed in response to said second crankshaft angular position signal;

a second voltage divider disposed to produce said reference voltage;

a differential amplifier having a first input terminal for receiving said reference voltage from said second voltage divider and a second input terminal connected to said first and second analog switches, another capacitor means for controlling spark advance being connected between an output terminal and said second input terminal of said differential amplifier, whereby said spark advance controlling capacitor means is selectively charged and discharged in accordance with the difference between the voltages at said first and second input terminals;

a comparator having a first input terminal for receiving the reference voltage from said second voltage divider and a second input terminal connected to the output terminal of said differential amplifier, whereby said comparator produces a discrimination signal when the voltage across said spark advance controlling capacitor means decreases to a predetermined value in response to the discharging thereof; and an AND circuit connected to said crankshaft angular position detecting means and said comparator for producing said ignition timing signal in response to said discrimination signal and said second crankshaft angular position signal.

13. A system according to claim 12, wherein said charge and discharge current control circuit comprises:

charge control means for charging said dwell time controlling capacitor means;

a third analog switch connected between said charge control means and said dwell time controlling capacitor means to be closed in response to said second crankshaft angular position signal;

discharge control means for discharging said dwell time controlling capacitor means; and a fourth analog switch connected between said discharge control means and said dwell time controlling capacitor means to be closed in response to said first crankshaft angular position signal produced after the generation of said ignition timing signal;

said third and fourth analog switches opening in response to said ignition timing signal to hold the voltage developed across said dwell time controlling capacitor means.

14. A system according to claim 12, wherein said charge and discharge current control circuit comprises:

a third voltage divider connected between said power source and the ground for providing a voltage lower than another reference voltage;

a third analog switch connected to said third voltage divider to be closed in response to said second crankshaft angular position signal;

a fourth voltage divider connected between said power source and the ground for providing a voltage higher than said another reference voltage;

a fourth analog switch connected to said fourth voltage divider to be closed in response to said first crankshaft angular position signal produced after the generation of said ignition timing signal;

another differential amplifier having a first input terminal for receiving said another reference voltage and a second input terminal connected to said third and fourth analog switches, said dwell time controlling capacitor means being connected between an output terminal and said second input terminal of said another differential amplifier, whereby said dwell time controlling capacitor means is selectively charged and discharged in accordance with the difference between the voltages at said first and second input terminals of said another differential amplifier;

another comparator having a first input terminal for receiving said another reference voltage and a second input terminal connected to the output terminal of said another diferential amplifier, said another comparator producing another discrimination signal to start the flow of current in the primary winding of said ignition coil when the voltage across said dwell time controlling capacitor means decreases to another predetermined value in response to the discharging thereof; and a fifth analog switch connected across said dwell time controlling capacitor means and to said another comparator to be closed in response to said another discrimination signal to completely discharge said dwell time controlling capacitor means;

whereby the closing of said third analog switch causes said dwell time controlling capacitor means to start charging, said third, fourth and fifth analog switches open in response to said ignition timing signal to hold the voltage developed across said dwell time controlling capacitor means, and the closing of said fourth analog switch causes dwell time controlling capacitor means to start discharging.

15. A system according to claim 12, wherein said ignition coil energization control circuit comprises ignition coil energizing means connected to said ignition timing computing means, said another comparator and said ignition coil and including at least one transistor, said ignition coil energizing means being responsive to said ignition timing signal to interrupt the flow of current in the primary winding of said ignition coil, said ignition coil energizing means being responsive to said another discrimination signal to start the flow of current in the primary winding of said ignition coil.

16. A system according to claim 11, wherein said current control circuit includes:

a differentiation circuit for differentiating said first crankshaft angular position signal; a transistor connected to said differentiation circuit to be turned on in response to the output of said differentiation circuit; and an integrating capacitor connected to said transistor to develop thereacross a voltage varying in accordance with the output of said differentiation circuit, whereby one of the charging and the discharging current of said dwell time controlling capacitor means is controlled in accordance with the rotational speed of said engine.

* * * * *